US009514710B2

(12) United States Patent  (10) Patent No.: US 9,514,710 B2
Castellani et al.  (45) Date of Patent: Dec. 6, 2016

(54) RESOLUTION ENHANCER FOR ELECTRONIC VISUAL DISPLAYS

(71) Applicant: International Business Machines Corporation, Armonk, NY (US)

(72) Inventors: Marzia E. Castellani, Zagarolo (IT); Fabrizio Loppini, Rome (IT); Ciro Ragusa, Lucera (IT); Roberto Ragusa, Lucera (IT)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 14/230,647

(22) Filed: Mar. 31, 2014

(65) Prior Publication Data

US 2015/0279327 A1  Oct. 1, 2015

(51) Int. Cl.
*G09G 5/12* (2006.01)
*G06F 3/14* (2006.01)
(Continued)

(52) U.S. Cl.
CPC ............... *G09G 5/12* (2013.01); *G06F 3/1454* (2013.01); *G06T 3/4053* (2013.01); *G06T 5/003* (2013.01);
(Continued)

(58) Field of Classification Search
None
See application file for complete search history.

(56) References Cited

U.S. PATENT DOCUMENTS 5,818,425 A * 10/1998 Want ..................... G06F 1/1626
345/158
6,788,293 B1 * 9/2004 Silverbrook ............. B41J 3/445
235/454
(Continued)

FOREIGN PATENT DOCUMENTS

CN  203057224 U  7/2013
EP  2354928 A1  8/2011
(Continued)

OTHER PUBLICATIONS

Raghavendar TS, "Resolution Vs Pixel Density in Displays—All You Need to Know", Dec. 11, 2013.*
(Continued)

*Primary Examiner* — Kee M Tung
*Assistant Examiner* — Yi Wang
(74) *Attorney, Agent, or Firm* — Jason H. Sosa

(57) ABSTRACT

A method of enhancing a visual image of a display is described. The visual image is displayed on a first display of a display device having a first display pixel density and a first display dimension. The display device detects an enhancer device oriented in an operable position to the display device. The enhancer display device has a second display having a second display pixel density higher than the first display pixel density and a second display dimension less than the first display dimension. A spatial orientation is determined between the first display of the display device with the second display of the enhancer display device. The display device sends the visual image and the spatial orientation to the enhancer display device to display a portion of the visual image that is defined by the spatial orientation on the second display in the second display pixel density.

3 Claims, 6 Drawing Sheets

(51) Int. Cl.
*G06T 5/00* (2006.01)
*G06T 5/50* (2006.01)
*G06T 3/40* (2006.01)

(52) U.S. Cl.
CPC .............. *G06T 5/50* (2013.01); *G06T 2210/36* (2013.01); *G09G 2300/023* (2013.01); *G09G 2340/045* (2013.01); *G09G 2340/0457* (2013.01); *G09G 2340/0492* (2013.01); *G09G 2370/022* (2013.01); *G09G 2370/04* (2013.01); *G09G 2370/16* (2013.01); *G09G 2370/22* (2013.01)

(56) References Cited

U.S. PATENT DOCUMENTS

| | | | |
|---|---|---|---|
| 2007/0052617 A1* | 3/2007 | Hanson et al. | 345/1.3 |
| 2007/0273609 A1* | 11/2007 | Yamaguchi | G06F 3/1423 345/1.1 |
| 2011/0175920 A1 | 7/2011 | Ieperen | |
| 2011/0292085 A1 | 12/2011 | Jabori | |

FOREIGN PATENT DOCUMENTS

| | | |
|---|---|---|
| EP | 2544174 A1 | 1/2013 |
| EP | 2632133 A1 | 8/2013 |
| WO | 2008029188 A1 | 3/2008 |
| WO | 2011042814 A1 | 4/2011 |

OTHER PUBLICATIONS

Graphics Systems, "Using iPad or iPhone as a 3D controller for SolidWorks," Graphics Systems SolidNotes, http://blog.gxsc.com/graphics_systems_solidnot/2012/02/draft-using-ipad-as-a-3d-controller-for-solidworks.html, Feb. 9, 2012.*

Woo et al., "Contact-and-connect: designing new pairing interface for short distance wireless devices." CHI'09 Extended Abstracts on Human Factors in Computing Systems. ACM, 2009.*

Hardy et al., "Exploring Expressive NFC-based Mobile Phone Interaction with Large Dynamic Displays", NFC '09: 2009 First International Workshop on Near Field Communication, Feb. 2009, pp. 36-41. © 2009 IEEE. DOI: 10.1109/NFC.2009.10.

Lee et al., "Collaboration between tabletop and mobile device", 2011 International Symposium on Ubiquitous Virtual Reality (ISUVR), Jul. 2011, pp. 29-32, © 2011 IEEE. DOI: 10.1109/ISUVR.2011.18.

Misterromin, "Control your iPhone/iPod another touch screen monitor—Worlds' First Solution!!", youtube.com, [retrieved on Nov. 14, 2013]. retrieved from: http://www.youtube.com/watch?v=d-znz1rJPwg.

Castellani, M. et al, "Resolution Enhancer for Electronic Visual Displays," U.S. Appl. No. 14/474,677, filed Sep. 2, 2014.

* cited by examiner

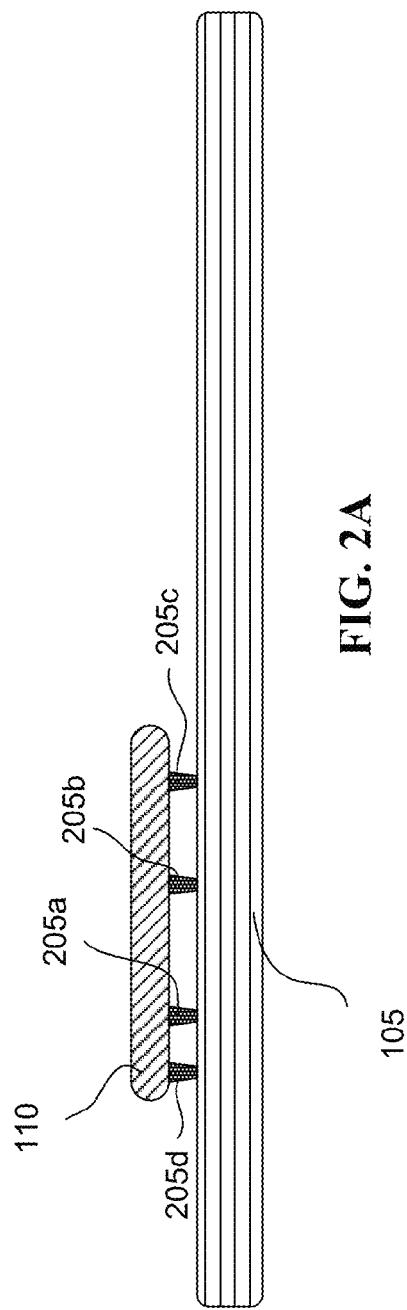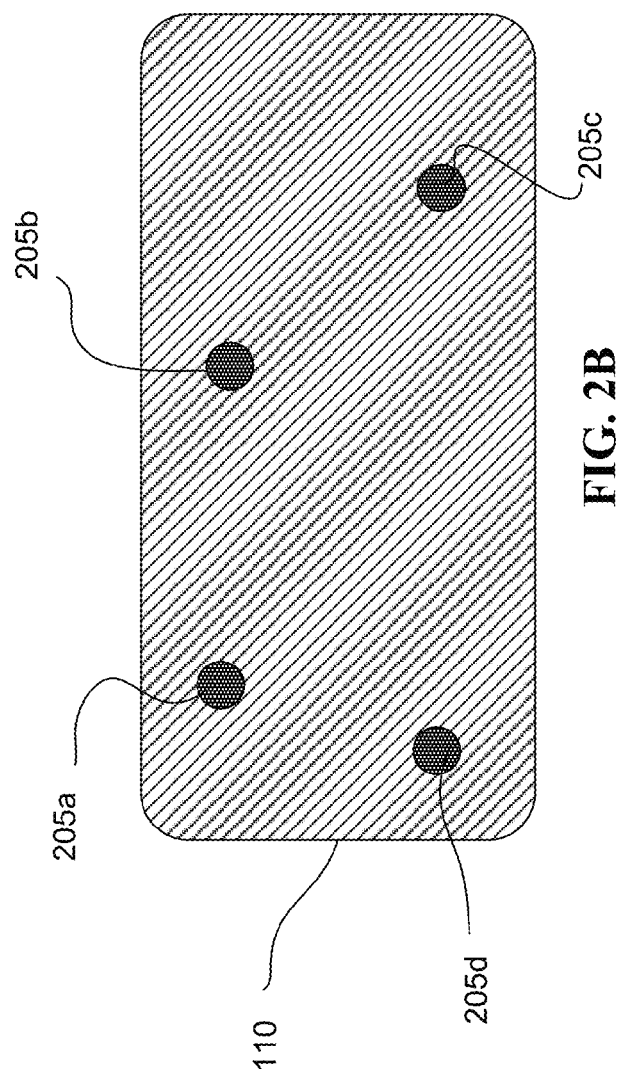

RESOLUTION ENHANCER FOR ELECTRONIC VISUAL DISPLAYS

BACKGROUND

The present disclosure relates to electronic visual displays, and more specifically, to a resolution enhancer system for electronic visual displays.

Electronic visual displays have become ubiquitous. Electronic visual displays perform temporary, video displays for presentation of images transmitted electronically. Electronic visual displays are used in televisions, computer monitors, tablet computers, cell phones, digital signs and touch tables, for example. The types of electronic visual displays may include cathode ray tubes, liquid crystal displays (LCDs), plasma, and light projection technologies. Another feature of electronic visual displays that has become ubiquitous is the ability for a user to interact directly with the visual display by touching it with a finger or object to expand, shrink, move, and perform commands with touch on the visual display.

SUMMARY

According to embodiments of the present disclosure a method of enhancing an electronic visual image of a display is described. The electronic visual image is displayed on a first display of a first display device having a first display pixel density and a first display dimension. The first display detects an enhancer display device oriented in an operable position to the first display device. The enhancer display device has a second display having a second display pixel density higher than the first display pixel density and a second display dimension less than the first display dimension. The first display device determines a spatial orientation between the first display of the first display device with the second display of the enhancer display device. The first display sends the electronic visual image and the spatial orientation to the enhancer display device to display a portion of the electronic visual image that is defined by the spatial orientation on the second display in the second display pixel density.

According to various embodiments, a method of enhancing an electronic visual image of a first display and an enhancer device doing the same is described. The method includes an enhancer display device receiving a spatial orientation of a first display of a first display device to a second display of the enhancer display device, when the enhancer display device is in a operable position with the first display device. The first display device has a first display pixel density and a first display dimension. The second display has a second display pixel density higher than the first display pixel density and a second display dimension less than the first display dimension. The enhancer display device receives an electronic visual image viewed on the first display. The enhancer display device determines a portion of the electronic visual image to be displayed on the second display of the enhancer display device. The portion is defined by the spatial orientation of the second display to the first display. The enhancer device displays on the second display of the enhancer display device the portion of the electronic visual image of the first display device determined by the enhancer display device.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 2A depicts a side view of a low pixel density first display device and an enhancer display device having contact points acting as a resolution enhancer for the first display device with contact points, according to various embodiments.

FIG. 2B depicts a side view of the resolution enhancer having the contact points, according to various embodiments.

Figure 1:
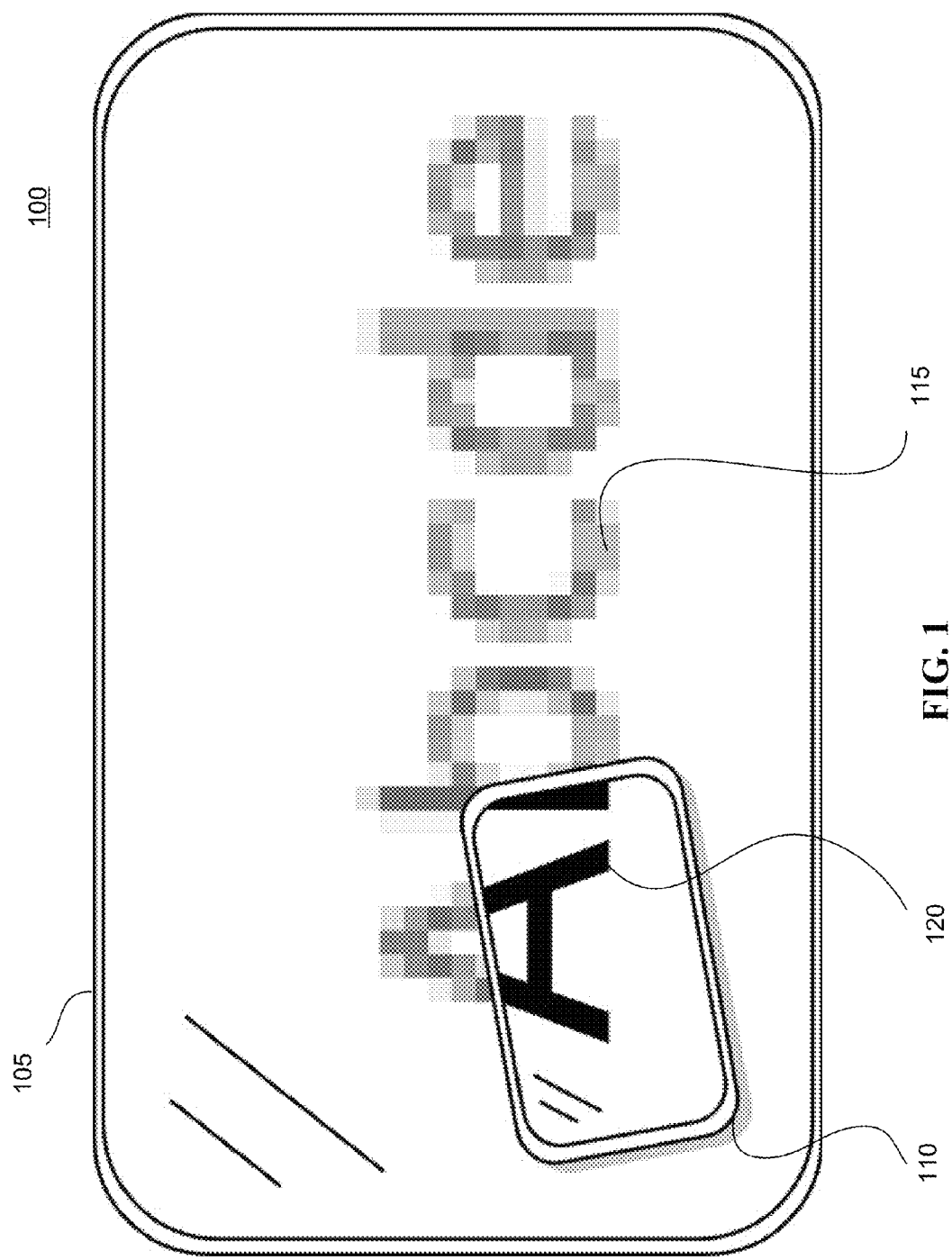
FIG. 1 depicts components of a resolution enhancer system for electronic visual displays, according to various embodiments.

While the embodiments are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to electronic visual displays, more particular aspects relate to a resolution enhancer system of electronic visual displays. While the present disclosure is not necessarily limited to such applications, various aspects of the disclosure may be appreciated through a discussion of various examples using this context.

Embodiments herein provide for a resolution enhancement system for electronic visual displays. The resolution enhancement system may include a first display device having a display with a low pixel density. The display of the first display device may be very large in dimensions, which may result in the low resolution quality. The resolution enhancement system may also include an enhancer display device with a high pixel density display that may be higher than that of the first display device. The enhancer display device may be smaller in dimensions than the first display device. The smaller dimension may contribute to the higher resolution display. The first display device and enhancer display device may be configured and communicatively linked so that when the enhancer display device is placed over an area of the display of the first display device, the enhancer display device displays the image from the first display that is directly beneath it in its higher pixel density display. The enhancer display device magnifies or enhances part of the low resolution image that is of interest to a user while leaving the remainder of the display of the first display device visible. The enhancer display device may be moved around the display of the first display device enhancing the portion of the visual display beneath in real time. The enhancer display device may receive input events from a user that may control the display of the first display device.

In an example, touch tables may have a planar surface that acts both as a display and as an input device. Touch tables are often used to visualize and interact with big data sets, for example, geographical maps, satellite photographs, or molecular representations. Touch tables may be in large dimensions, e.g., 1 m×2 m, but spatial resolution of the display may be sacrificed, both for complexity and cost reasons. For example, when a 160×90 cm table is driven by standard HDTV resolution (1920×1080), the resulting pixel-per-inch display quality is about 30 ppi (1920/(160/2.54)). Maps on traditional paper may have much better resolution (common laser printers have 300, 600 or 1200 ppi). Whereas to meet 330 ppi on that same screen would require a 19200×10800 pixel display; and the cost increase would be large (100× pixels, 100× computing power to draw them).

Thus, high spatial resolution of large dimension displays inevitably leads to higher costs. The touch tables may have a general view of a dataset and when one focuses one's attention to a specific zone, software generally provides a way to zoom in and out (e.g., by pinching the screen with one's fingers or other similar control gestures), However, the need to continuously zoom may be time consuming, and, as an entire display is adjusted, one may lose the "big-picture view" when focusing in on details or get lost in such details. With these considerations, enhanced resolution may only be needed, or be most beneficial, in a part of the display where the user is directing their attention. Embodiments herein may provide for a resolution enhancement system and method to view portion of a large, low pixel density display in a higher display resolution. Embodiments herein may also provide an enhancer display device with the capacity to receive input events at the enhancer display device (e.g., such as by using gestures as would have been used on the first display device and controlling the display of the first display device as if the gestures received on the enhancer display device occurred on the corresponding portion of the display of the first display device.

FIG. 1 depicts a resolution enhancement system 100, according to various embodiments. The resolution enhancement system 100 may include a first display device 105 and an enhancer display device 110. The first display device 105 may have a first display 115 and the enhancer display device 110 may have a second display 120. The first display 115 may have a first display pixel density. The second display 120 may have a second display pixel density that is higher than the first display pixel density.

The first display device 105 may project the visual display of a computer program product on the first display 115, or any other application that produces an electronic visual display. In FIG. 1, the first display device 105 may display an electronic visual image "Abcde" in the first display pixel density on the first display 115. The enhancer display device 110 may overlap/obstruct the first display 115 of the first display device 105. The first display device 105 may be able to detect when an enhancer display device 110 is in a position relative to the first display device 105 to relay a portion of the first display that is covered by the dimensions of the second display 120 to the second display 120. This may be referred to herein as the enhancer display device 110 being in an operable position to the first display device 105. FIG. 2A and FIG. 2B illustrates various embodiments of detecting the operable position of the enhancer display device 110 with the first display device 105.

When the enhancer display device 110 is in operable position with the first display device 105, the first display device 105 may be able to determine the spatial orientation between the first display device 105 and the enhancer display device 110. For instance, the first display device 105 may detect a rotational orientation and a translational position of the enhancer display device 110 to the first display device 105. If the enhancer display device 110 is rectangular in shape, then the edges of the enhancer display device may be angled such that the edges of the first display device 105 are not parallel to the edges of the enhancer display device 110. The first display device 105 may communicate this to the enhancer display device 110 so that the enhancer display device 110 may adjust the second display 220 to rotate the electronic visual image accordingly so the orientation of the electronic visual image is not different on the second display 120 than what is on the first display 115. As shown in FIG. 1, the enhancer display device 110 may display in the second display part of the image "Abcde" that the enhancer display device 110 is over, which includes a portion of the "Ab".

The first display device 105 and the enhancer display device 110 may communicate with each other through a data communication link. The data communication link may be a wireless data communication link such as communicating through WiFi, Bluetooth, and near-field-communications (NFC). In various embodiments, the first display device 105 may communicate with the enhancer display device 110 with a physical data communication link.

The first display device 105 may have or be in communication with a processor that may perform functions of a central display module stored in a memory. The central display module is further described in FIG. 5 below. In various embodiments, the central display module may detect the enhancer display device 110 to be in an operable position, such as with a physical signature of the enhancer display device 110 on the first display 115 (explained further in FIGS. 2A and 2B) or laser device. In various embodiments, the central display module may also estimate the spatial orientation of the enhancer display device 110 such as position and rotation of the enhancer display device 110. In various embodiments, the central display module may send spatial orientation data to the first display device 105 through the data communication link. In various embodiments, the central display module may send an electronic visual image to the enhancer display device 110. In various embodiments, the central display module may receive input events from the enhancer display device 110 through the data communication link and perform them as if they were performed on the first display device.

The enhancer display device 110 may have or be in communication with a processor that may perform one or more functions of an enhancer display module. The enhancer display module is further described in FIG. 6 below. In various embodiments, the enhancer display module may receive spatial orientation information through the data communication link from the first display device 105 and use the spatial orientation information to adjust the view of the electronic visual image. In other embodiments, the enhancer display module may receive an adjusted electronic visual image from the first display device. The central display module may perform the adjustment of the portion of the electronic visual image to be displayed on the second display 120. The enhancer display module may also send any input events, such as gestures, detected through the data communication link to the first display device 105, which the first display device 105 may use to adjust the image or user interface. This may allow the user to use the enhancer device the same as if it was the large display.

In operation, the first display device may be running an application that produces an electronic visual image on the first display 115 of the first display device 105. The electronic visual image may have the first pixel density. The enhancer display device 110 may be placed over or in an operable position to an area of interest of the first display 115. The first display device 105 may detect that the enhancer display device 110 is in an operable position and establish a data communication link with the enhancer display device 110. In various embodiments, a data communication link may already be established. In various embodiments, the enhancer display device 110 may detect when the first display device 105 is in operable position.

When the enhancer display device 110 is in operable position with the first display device 105, the first display device may detect the spatial orientation of the second display 120 of the enhancer display device 110 in relation to the first display 115. The first display device 105 may send over the data communication link the spatial orientation and electronic visual image. The enhancer display device 110 may use the spatial orientation information to adjust the view of the image to match the orientation of the image on the first display 120. The enhancer display device may be able to receive input events and send them to the first display device 105 over the data communication link. The first display device 105 may be able to operate on the input events from the enhancer 110 as if they were locally performed on the first display device 105.

FIG. 2A depicts a side view of the first display device 105 and the enhancer display device 110 in contact with the first display device 105 for spatial orientation detection, according to various embodiments. For the first display device 105 to detect the spatial orientation of the enhancer display device 110, the enhancer display device 110 may have a plurality of contact points, such as contact points 205*a*, 205*b*, 205*c*, and 205*d* (referred to generally herein as contact points 205), that come in contact with the first display 115. In various embodiments, the central display module and first display 115 may be configured to recognize the contact points 205 as a unique signature of the enhancer display device 110. In various embodiments, the central display module may be configured to distinguish the contact points 205 from other inputs to the first display 115 such as a user's finger, a stylist, or other tool to create inputs on the first display 115. In various embodiments, the contact points 205 when in contact with the first display may also indicate that the enhancer display device 110 is in the operable position. In various embodiments, the first display device 105 and enhancer display device 110 being in operable position may trigger the data communication link to be established.

In various embodiments, the central display module may be configured to determine the spatial orientation such as the translation position and rotational orientation by analyzing the signature of the contact points 205. The contact points 205 may be in a specific geometric disposition to aid the central display module in determining the spatial orientation. For example, there may be four contact points 205 on the second display 110 as shown in FIG. 2B and the contact points 205 may be in trapezoidal orientation so that central display module may be able to distinguish between the contact points 205. After the central display module has determined the spatial orientation of the enhancer display device 110, then it may send the spatial orientation data to the enhancer display device 110 through the data communication link. The enhancer display device 110 may then update the second display 120 to adjust the view of the electronic visual image to be that of the portion of the visual image covered by the second display 120 over the first display 110. This may be done in real-time so that visual electronic images of both the first display 115 and the second display 120 are providing the same images. In other various embodiments, more than one enhancer display device 110 may be used to enhance the resolution of the first display 115.

Figure 3:
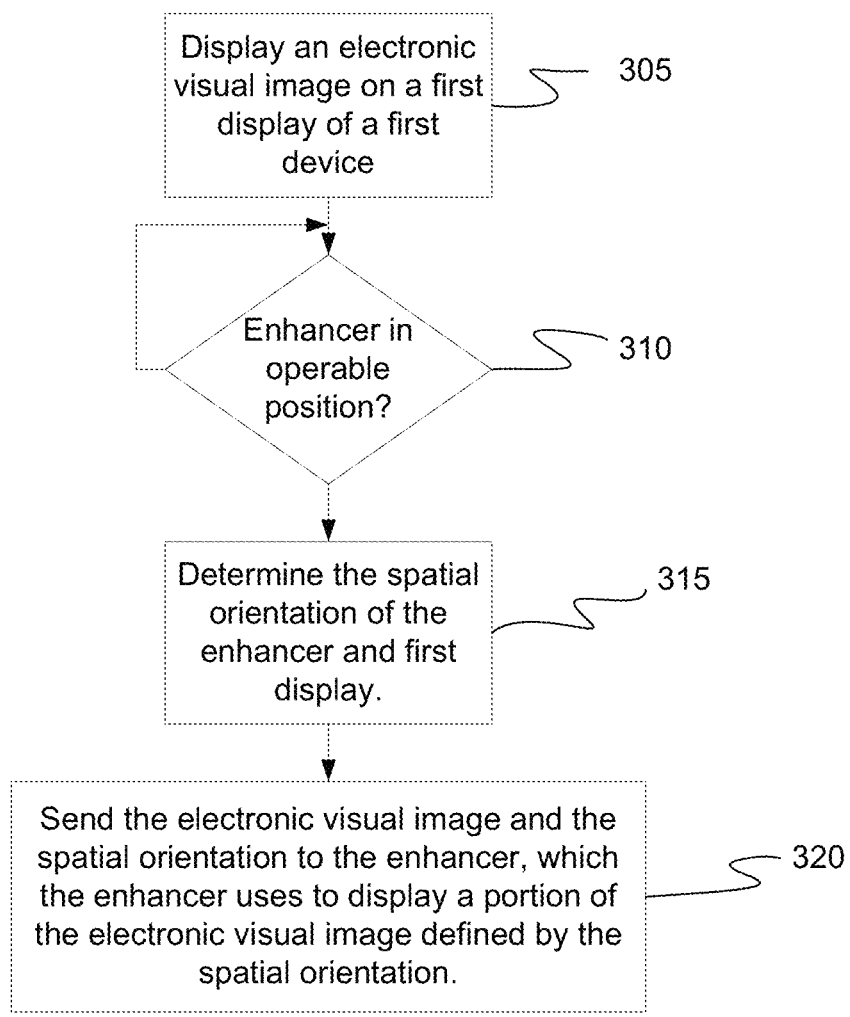
FIG. 3 depicts a flowchart of a method of resolution enhancement of an electronic visual image displayed on a display of the first display device, according to various embodiments.

FIG. 3 illustrates a flowchart of a method 300 of resolution enhancement of an electronic visual image displayed on a display, according to various embodiments. In operation 305, a first display device may display an electronic visual image on a first display of the first display device. The first display device may have a first display pixel density and a first display dimension. In operation 310, the first display device may determine whether an enhancer display device is orientated in an operable position to the first display device. The enhancer display device may have a second display. The second display may have a second display pixel density and a second display dimension. The second display pixel density may be higher than the first display pixel density and the second display dimension may be smaller than the first display dimension. If an enhancer display device is not in operable position, then the first display device may continue to monitor whether there is an enhancer display device in operable position. If there is an enhancer display device in operable position with the first display device, then the method may continue with operation 315.

In operation 315, the first display device may determine the spatial orientation of the enhancer display device to the first display. The spatial orientation may include the translational position and the rotational position of the enhancer display device to the first display. In operation 320, the first display device may send the electronic visual image and the spatial orientation to the enhancer display device. The enhancer display device may use this information to display a portion of the electronic visual image defined by the spatial orientation on the second display in the higher second display pixel density.

Figure 4:
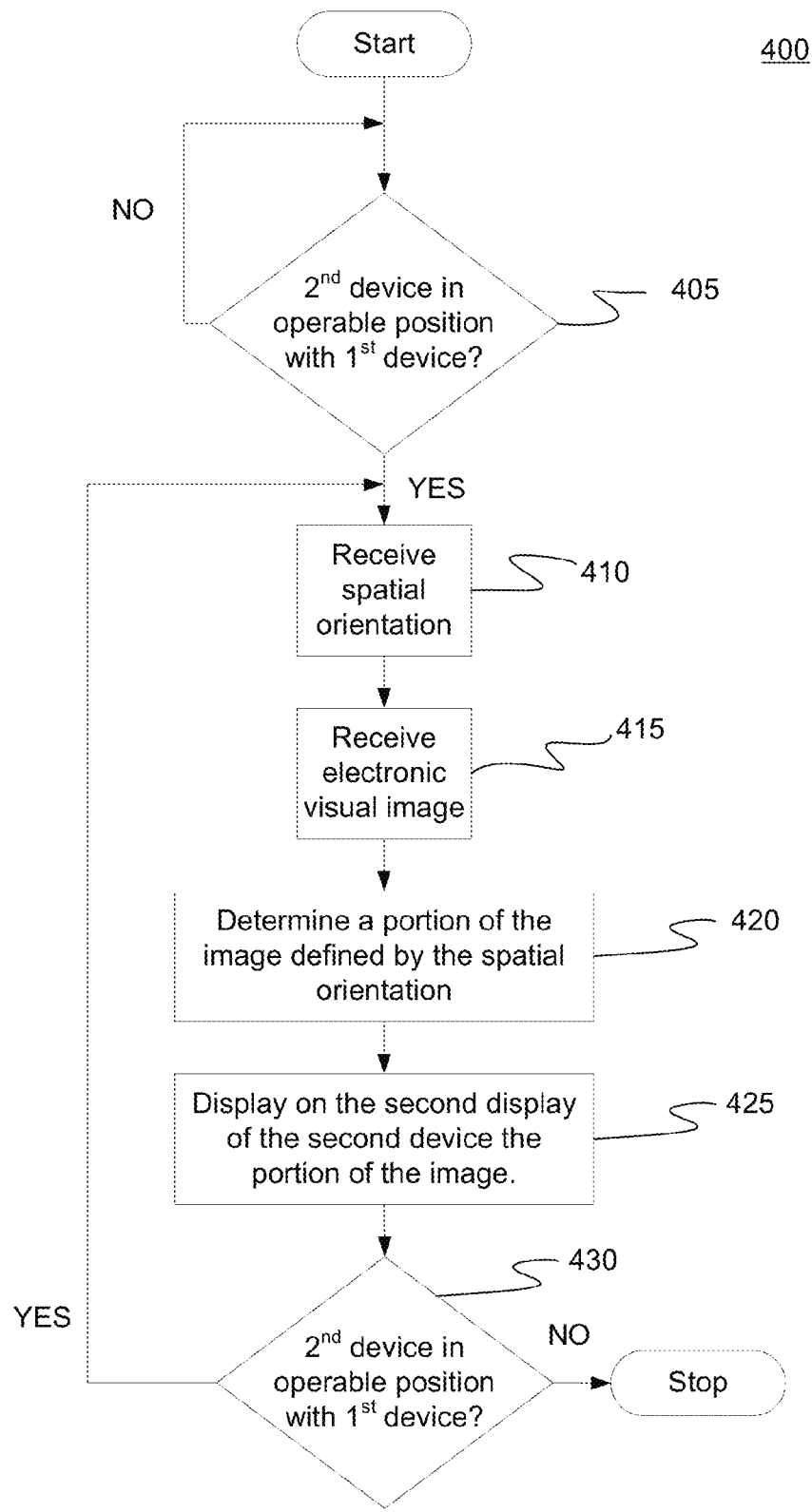
FIG. 4 depicts a flowchart of a method performed by the enhancer display device of resolution enhancement of an electronic visual image displayed a first display device, according to various embodiments.

FIG. 4 illustrates a flowchart of a method 400 performed by an enhancer display device of enhancing the display resolution of an electronic visual image produced on a first display device having a low pixel density, according to various embodiments. In operation 405, the enhancer display device may determine when it is in operable position with the first display device. The first display device may have a first display with a first display pixel density and a first display dimension. The enhancer display device may have a second display with a second display pixel density and a second display dimension. The second display pixel density may be higher than the first display pixel density. The second display dimension may be smaller than the first display dimension. If the enhancer display device is not in operable position with the first display device, then the enhancer display device may continue to monitor until it is in operable position. If the enhancer display device is in operable position with the first display device, then the method 400 may continue to operation 410.

In operation 410, the enhancer display device may receive a spatial orientation of the second display in relation to the first display. In various embodiments, the spatial orientation may include the translational position and the rotational position. In operation 415, the enhancer display device may receive an electronic visual image that is displayed on the first display. In operation 420, based on the spatial orientation and the received electronic visual image, the enhancer display device may determine a portion of the electronic visual image defined by the spatial orientation. In operation 425, the enhancer display device may display the portion of the electronic visual image on the second display in the second display pixel density. In operation 430, the enhancer display device may determine whether the enhancer display device is in operable position with the first display device. If the enhancer display device is in operable position, then the method 400 may return to operation 410. If the enhancer display device is not in operable position, then the method 400 may end.

Figure 5:
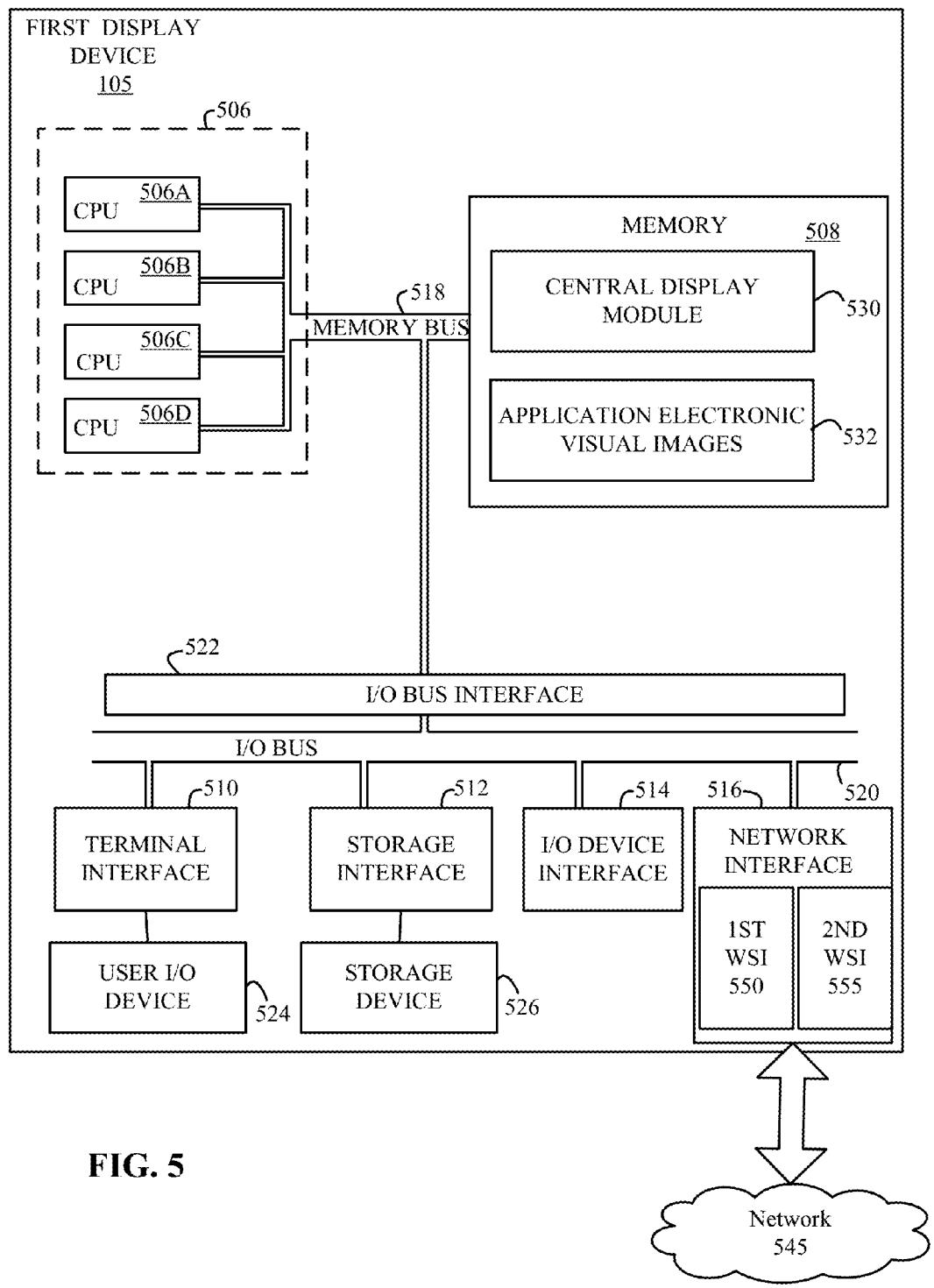
FIG. 5 depicts a high-level block diagram representation of the first display device, according to an embodiment.

Referring to the drawings, FIG. 5 depicts a high-level block diagram representation of a first display device 105, according to an embodiment. The major components of the first display device 105 may include one or more processors 506, a main memory 508, a terminal interface 510, a storage interface 512, an I/O (Input/Output) device interface 514, and a network interface 516, all of which may be communicatively coupled, directly or indirectly, for inter-component communication via a memory bus 518, an I/O bus 520, and an I/O bus interface unit 522.

The first display device 105 may contain one or more general-purpose programmable central processing units (CPUs) 506A, 506B, 506C, and 506D, herein generically referred to as the processor 506. In an embodiment, the first display device 105 may contain multiple processors typical of a relatively large system; however, in another embodiment the first display device 105 may alternatively be a single CPU system. Each processor 506 may execute instructions stored in the main memory 508 and may include one or more levels of on-board cache.

In an embodiment, the main memory 508 may include a random-access semiconductor memory, storage device, or storage medium (either volatile or non-volatile) for storing or encoding data and programs. In another embodiment, the main memory 508 may represent the entire virtual memory of the first display device 105, and may also include the virtual memory of other devices coupled to first display device 105 or connected via the network 545. The main memory 508 may be conceptually a single monolithic entity, but in other embodiments the main memory 508 may be a more complex arrangement, such as a hierarchy of caches and other memory devices.

The main memory 508 may store or encode a central display module 530 and application electronic visual images 532. Although central display module 530 and application electronic visual images 532 are illustrated as being contained within the memory 508 in the first display device 105, in other embodiments the central display module 530 and application electronic visual images 532 may be on different computer systems and may be accessed remotely, e.g., via the network 545. The first display device 105 may use virtual addressing mechanisms that allow the programs of the first display device 105 to behave as if they only have access to a large, single storage entity instead of access to multiple, smaller storage entities. Thus, while central display module 530 and application electronic visual images 532 are illustrated as being contained within the main memory 508, this element is not necessarily completely contained in the same storage device at the same time.

In an embodiment, wireless device network interface instructions 530 may include instructions or statements that execute on the processor 506 or instructions or statements that may be interpreted by instructions or statements that execute on the processor 506, to carry out the functions as further described above with reference to FIG. 1 and FIG. 3.

In another embodiment, central display module 530 and application electronic visual images 532 may be implemented in hardware via semiconductor devices, chips, logical gates, circuits, circuit cards, other physical hardware devices, or a combination of these devices in lieu of, or in addition to, a processor-based system. In an embodiment central display module 530 and application electronic visual images 532 may include data in addition to instructions or statements.

The memory bus 518 may provide a data communication path for transferring data among the processor 506, the main memory 508, and the I/O bus interface 522. The I/O bus interface 522 may be further coupled to the I/O bus 520 for transferring data to and from the various I/O units. The I/O bus interface unit 522 communicates with multiple I/O interface units 510, 512, 514, and 516, which may also be known as I/O processors (IOPs) or I/O adapters (IOAs), through the I/O bus 520.

The I/O interface units support communication with a variety of storage and I/O devices. For example, the terminal interface unit 510 supports the attachment of one or more user I/O devices 524, which may include user output devices (such as a video display device, speaker, or television set), e.g. first display 115, and user input devices (such as a keyboard, mouse, keypad, touchpad, trackball, buttons, light pen, or other pointing device). A user may manipulate the user input devices utilizing a user interface, in order to provide input data and commands to the user I/O device 524 and the computer system 500, and may receive output data via the user output devices. For example, a user interface may be presented via the user I/O device 524, such as displayed on a display device, played via a speaker, or printed via a printer.

The storage interface 512 supports the attachment of one or more disk drives or direct access storage devices 526 (which are typically rotating magnetic disk drive storage devices, although they could alternatively be other storage devices, including arrays of disk drives configured to appear as a single large storage device to a host computer). In another embodiment, the storage device 526 may be implemented via any type of secondary storage device. The contents of the main memory 508, or any portion thereof, may be stored to and retrieved from the storage device 526 as needed. The I/O device interface 514 may provide an interface to any of various other input/output devices or devices of other types, such as printers or fax machines. The network interface 516 may provide one or more communications paths from the first display device 105 to other digital devices, network nodes, and networks 545. The network interface 516 may include a first wireless signal interface 550 and a second wireless signal interface 555. In an embodiment, the first wireless signal interface 550 may provide service for a wireless local area network (WLAN). The first wireless signal interface 550 may support one or more of various WLAN protocol standards. Such protocol standards may include the IEEE 802.11a, IEEE 802.11b, IEEE 802.11g, and/or IEEE 802.11n protocol standards. The first wireless signal interface 550 may produce a first wireless signal having a first range.

In an embodiment, the second wireless signal interface 555 may provide service for a wireless personal area network (WPAN). A type of WPAN the second wireless signal interface 555 may support is a Bluetooth communication standard, the IEE 802.15 standard, or another communication standard. The second wireless signal interface 555 may produce a second wireless signal having a second range.

Figure 6:
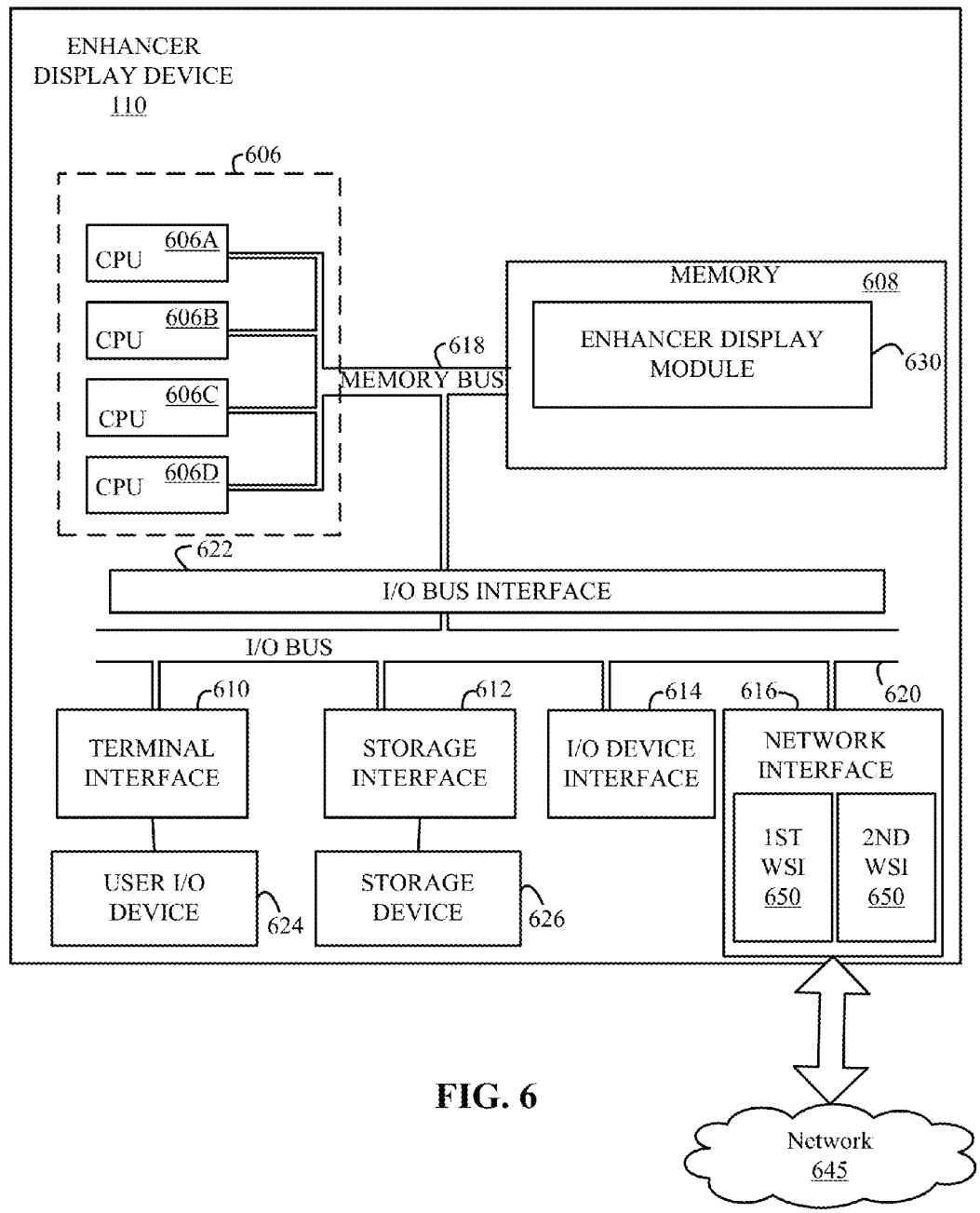
FIG. 6 depicts a high-level block diagram representation of the enhancer display device, according to an embodiment.

Referring to the drawings, FIG. 6 depicts a high-level block diagram representation of an enhancer display device 110, according to an embodiment. The major components of the enhancer display device 110 may include one or more processors 606, a main memory 608, a terminal interface 610, a storage interface 612, an I/O (Input/Output) device interface 614, and a network interface 616, all of which may be communicatively coupled, directly or indirectly, for inter-component communication via a memory bus 618, an I/O bus 620, and an I/O bus interface unit 622.

The enhancer display device 110 may contain one or more general-purpose programmable central processing units (CPUs) 606A, 606B, 606C, and 606D, herein generically referred to as the processor 606. In an embodiment, the enhancer display device 110 may contain multiple processors typical of a relatively large system; however, in another embodiment the enhancer display device 110 may alternatively be a single CPU system. Each processor 606 may execute instructions stored in the main memory 608 and may include one or more levels of on-board cache.

In an embodiment, the main memory 608 may include a random-access semiconductor memory, storage device, or storage medium (either volatile or non-volatile) for storing or encoding data and programs. In another embodiment, the main memory 608 may represent the entire virtual memory of the enhancer display device 110, and may also include the virtual memory of other devices coupled to enhancer display device 110 or connected via the network 645. The main memory 608 may be conceptually a single monolithic entity, but in other embodiments the main memory 608 may be a more complex arrangement, such as a hierarchy of caches and other memory devices.

The main memory 608 may store or encode an enhancer display module 630. Although the enhancer display module 630 is illustrated as being contained within the memory 608 in the enhancer display device 110, in other embodiments the enhancer display module 630 may be on different computer systems and may be accessed remotely, e.g., via the network 645. The enhancer display device 110 may use virtual addressing mechanisms that allow the programs of the enhancer display device 110 to behave as if they only have access to a large, single storage entity instead of access to multiple, smaller storage entities. Thus, while enhancer display module 630 are illustrated as being contained within the main memory 608, this element is not necessarily completely contained in the same storage device at the same time.

In an embodiment, wireless device network interface instructions 630 may include instructions or statements that execute on the processor 606 or instructions or statements that may be interpreted by instructions or statements that execute on the processor 606, to carry out the functions as further described above with reference to FIG. 1, FIG. 2A, FIG. 2B, and FIG. 4. In another embodiment, enhancer display module 630 may be implemented in hardware via semiconductor devices, chips, logical gates, circuits, circuit cards, other physical hardware devices, or a combination of these devices in lieu of, or in addition to, a processor-based system. In an embodiment enhancer display module 630 may include data in addition to instructions or statements.

The memory bus 618 may provide a data communication path for transferring data among the processor 606, the main memory 608, and the I/O bus interface 622. The I/O bus interface 622 may be further coupled to the I/O bus 620 for transferring data to and from the various I/O units. The I/O bus interface unit 622 communicates with multiple I/O interface units 610, 612, 614, and 616, which may also be known as I/O processors (IOPs) or I/O adapters (OAs), through the I/O bus 620.

The I/O interface units support communication with a variety of storage and I/O devices. For example, the terminal interface unit 610 supports the attachment of one or more user I/O devices 624, which may include user output devices (such as a video display device, speaker, or television set), e.g. second display 120 of FIG. 1, and user input devices (such as a keyboard, mouse, keypad, touchpad, trackball, buttons, light pen, or other pointing device). A user may manipulate the user input devices utilizing a user interface, in order to provide input data and commands to the user I/O device 624 and the computer system 600, and may receive output data via the user output devices. For example, a user interface may be presented via the user I/O device 624, such as displayed on a display device, played via a speaker, or printed via a printer.

The storage interface 612 supports the attachment of one or more disk drives or direct access storage devices 626 (which are typically rotating magnetic disk drive storage devices, although they could alternatively be other storage devices, including arrays of disk drives configured to appear as a single large storage device to a host computer). In another embodiment, the storage device 626 may be implemented via any type of secondary storage device. The contents of the main memory 608, or any portion thereof, may be stored to and retrieved from the storage device 626 as needed. The I/O device interface 614 may provide an interface to any of various other input/output devices or devices of other types, such as printers or fax machines. The network interface 616 may provide one or more communications paths from the enhancer display device 110 to other digital devices, network nodes, and networks 645. The network interface 616 may include a first wireless signal interface 650 and a second wireless signal interface 655. In an embodiment, the first wireless signal interface 650 may provide service for a wireless local area network (WLAN). The first wireless signal interface 650 may support one or more of various WLAN protocol standards. Such protocol standards may include the IEEE 802.11a, IEEE 802.11b, IEEE 802.11g, and/or IEEE 802.11n protocol standards. The first wireless signal interface 650 may produce a first wireless signal having a first range.

In an embodiment, the second wireless signal interface 655 may provide service for a wireless personal area network (WPAN). A type of WPAN the second wireless signal interface 655 may support is a Bluetooth communication standard, the IEE 802.15 standard, or another communication standard. The second wireless signal interface 655 may produce a second wireless signal having a second range.

Referring to FIG. 5 and FIG. 6, the present embodiments may be a system, a method, and/or a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. An enhancer display device, comprising:
   a physical structure, which acts as a unique signature of the enhancer display device, and is detectable by a first display device, wherein the unique signature identifies to the first display device the enhancer display device and indicates that the enhancer display device is in an operable position relative to the first display device;
   a processor; and a memory communicatively coupled to the processor, wherein the memory is encoded with instructions, and wherein the instructions when executed by the processor include:

receiving, with the enhancer display device, a spatial orientation of a first display of the first display device to a second display of the enhancer display device, when the enhancer display device is in an operable position with the first display device, where the first display has a first display pixel density and a first display dimension, and the second display has a second display pixel density higher than the first display pixel density and a second display dimension less than the first display dimension;

receiving an electronic visual image viewed on the first display;

determining a portion of the electronic visual image to be displayed on the second display of the enhancer display device, the portion is defined by the spatial orientation of the second display to the first display, wherein the portion of the electronic visual image to be displayed corresponds to a portion of the electronic visual image viewed on the first display that is directly overlaid by the enhancer display device;

displaying on the second display of the enhancer display device the portion of the electronic visual image of the first display device determined by the enhancer display device;

detecting an input event made on the enhancer display device; and sending the input event to the first display device to update the electronic visual image on the first display device as if the input event occurred on the corresponding portion of the electronic visual image on the first display overlaid by the enhancer display device.

2. The enhancer display device of claim 1, wherein the unique signature is made up of contact points having a specific geometric disposition.

3. The enhancer display device of claim 2, wherein the unique signature has four contact points in the geometric disposition of a trapezoid.

\* \* \* \* \*